(12) United States Patent
Shimodaira et al.

(10) Patent No.: US 6,208,397 B1
(45) Date of Patent: Mar. 27, 2001

(54) OPTICAL MEMBER CELL SUBSTRATE AND LIQUID-CRYSTAL DISPLAY

(75) Inventors: Kiichi Shimodaira; Masayuki Satake; Toshiyuki Umehara; Hiroshi Sugawa, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/387,733

(22) Filed: Sep. 1, 1999

(30) Foreign Application Priority Data

Sep. 3, 1998 (JP) .................................................. 10-267464

(51) Int. Cl.[7] ...................... G02F 1/1333; G02F 1/1335; B05D 5/10
(52) U.S. Cl. ............................ 349/122; 349/158; 349/98; 349/117; 349/112
(58) Field of Search ................................ 349/96, 98, 112, 349/115, 74, 122, 158; 428/393; 399/117

(56) References Cited

U.S. PATENT DOCUMENTS 4,358,494 * 11/1982 Akimoto et al. ................ 427/208.04
4,387,133 * 6/1983 Ichikawa et al. ..................... 349/122
5,880,800 * 3/1999 Mikura et al. ........................ 349/122

* cited by examiner

*Primary Examiner*—William L. Sikes
*Assistant Examiner*—Toan Ton
(74) *Attorney, Agent, or Firm*—Sughrue, Mion, Zinn, Macpeak & Seas, PLLC

(57) ABSTRACT

There is provided an optical member having an optical material and a tacky layer provided on at least one surface of the optical material. The tacky layer has an initial adhesive force of not smaller than 400 g per 25 mm based on 90° peeling from a resin substrate and has an adhesive force of not larger than 1000 g per 25 mm after heating at 70° C. for 5 hours. There is also provided a cell substrate made of a resin substrate. The resin substrate has an initial adhesive force of not smaller than 400 g per 25 mm on based on 90° peeling from the tacky layer provided on the optical material and having an adhesive force of not larger than 1000 g per 25 mm after heating at 70° C. for 5 hours. And there is provided a liquid-crystal display in which the optical member is adhesively bonded through the tacky layer of the optical member to the surface of a liquid-crystal cell formed by used of the cell substrate.

18 Claims, 1 Drawing Sheet

OPTICAL MEMBER CELL SUBSTRATE AND LIQUID-CRYSTAL DISPLAY

BACKGROUND OF THE INVENTION

1. Field of the Invention

The present invention relates to an optical member of a tacky layer additional provision type capable of being peeled without causing any injury of a liquid-crystal cell at the time of mistaken adhesive bonding, or the like, and excellent in durability of an adhesive state so as to be adapted for formation, or the like, of a liquid-crystal display, and a resin type cell substrate therefor.

The present application is based on Japanese Patent Application No. Hei. 10-267464, which is incorporated herein by reference.

2. Description of the Related Art

An optical material such as a polarizing plate, a phase-difference plate, an elliptically polarizing plate formed by lamination thereof, or the like, used in a liquid crystal display (LCD) is a key device for the LCD. A method of adhesively bonding the optical material to a liquid-crystal cell in a state of an optical member in which a tacky layer of an acrylic type adhesive, or the like, is added in advance to the optical material is used for the purposes of preventing the quality from varying, improving efficiency in assembling the LCD, and so on.

In the above description, if alien substances such as contaminations, air bubbles, etc. are mixed in a portion when the optical member is adhesively bonded to the liquid-crystal cell, the portion causes visibility failure. Accordingly, the optical member must be peeled or released from the liquid-crystal cell because of the mistaken adhesive bonding so that the liquid-crystal cell can be recycled. The mistaken adhesive bonding is generally found in examination steps, or the like, in a process following the adhesive bonding of the optical member. Accordingly, the optical member is generally peeled or released from the liquid-crystal cell when at least several hours have passed after the adhesive bonding. In some cases, the optical member may be peeled or released from the liquid-crystal cell when a month or more has passed.

The background-art optical member, however, had a problem that variations in cell gaps and injuries such as damage of a cell substrate, etc. were caused by the flexibility, or the like, of the cell substrate when the optical member was peeled or released from the liquid-crystal cell using a resin substrate as the cell substrate. If the adhesive force is reduced so that good releasability is given, there arises another problem that peeling or rising occurs in the optical member or marks made by foaming are generated in the adhesively bonded interface because of the influence of moisture and heat when the optical member is used practically for the LCD, or the like.

SUMMARY OF THE INVENTION

An object of the present invention is to develop an optical member which is capable of being peeled without causing any injury of a liquid cell using a resin substrate as a cell substrate and without causing any injury of the cell substrate at the time of mistaken adhesive bonding, or the like, to thereby make it possible to recycle the liquid-crystal cell and which exhibits stable adhesive characteristic in an adhesively bonded state to thereby prevent defects such as peeling, rising, foaming, etc., from occurring even in the case where the liquid-crystal cell is of a thin type or of a large-size type, and to develop the cell substrate therefor.

According to the present invention, there are provided: an optical member including an optical material either one of or each of two surfaces of which is coated with a tacky layer having an initial adhesive force of not smaller than 400 g per 25 mm on the basis of 90° peeling from a resin substrate and having an adhesive force of not smaller than 1000 g per 25 mm after heating at 70° C. for 5 hours; a cell substrate comprising a resin substrate having an initial adhesive force of not smaller than 400 g per 25 mm on the basis of 90° peeling from a tacky layer provided on an optical material and having an adhesive force of not smaller than 1000 g per 25 mm after heating at 70° C. for 5 hours; and a liquid-crystal display wherein such an optical member as described above is adhesively bonded, through a tacky layer of the optical member, to either one of or each of two surfaces of a liquid-crystal cell formed by use of such a cell substrate as mentioned above.

According to the present invention, it is possible to obtain an optical member and a resin type cell substrate, in which, even when the liquid crystal cell using a resin substrate as a cell substrate is thin or large in size, adhesive force is moderate so that the optical member can be peeled or released easily without causing any injury of the liquid-crystal cell and without causing any injury of the resin substrate at the time of mistaken adhesive bonding. Accordingly, the liquid-crystal cell can be recycled. Further, the optical member exhibits stable adhesive characteristic in an adhesively bonded state so that defects such as peeling, rising, foaming, etc. hardly occur. Accordingly, it is possible to obtain a resin type cell substrate therefor; and a liquid-crystal display excellent in quality and durability.

Features and advantages of the invention will be evident from the following detailed description of the preferred embodiments described in conjunction with the attached drawings.

DETAILED DESCRIPTION OF THE PREFERRED EMBODIMENTS

Figure 1:
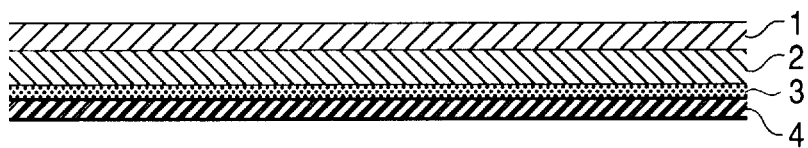
FIG. 1 is a sectional view of an example of an optical member.
Figure 2:
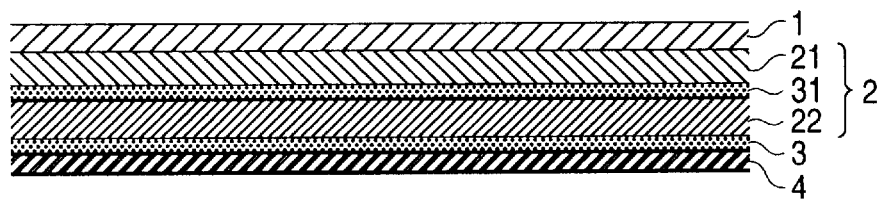
FIG. 2 is a sectional view of another example of the optical member.

An optical member according to the present invention is constituted by an optical material either one of or each of two surfaces of which is coated with: a tacky layer having an initial adhesive force of not smaller than 400 g per 25 mm on the basis of 90° peeling from a resin substrate and having an adhesive force of not larger than 1000 g per 25 mm after heating at 70° C. for 5 hours. FIGS. 1 and 2 show examples of the optical member. The reference numeral 2 designates an optical material; and 3, a tacky layer. In FIG. 2, the reference numeral 21 designates a polarizing plate; and 22, a phase-difference plate. The polarizing plate 21 and the phase-difference plate 22 are laminated through a tacky layer 31 to thereby form an elliptically polarizing plate as an optical material 2. Incidentally, the reference numeral 1 designates a protective film; and 4, a separator.

As the optical material, there is used an optical material such as a polarizing plate, a phase-difference plate, an elliptically polarizing plate formed by lamination of a polarizing plate and a phase-difference plate, a reflection type polarizing plate, an elliptically polarizing plate using a reflection type polarizing plate, or the like, used for formation of a liquid-crystal display, or the like. The optical material as to the kind thereof is not limited specifically. Incidentally, in the case of a laminate type optical material such as an elliptically polarizing plate, any suitable adhesively bonding means such as a tacky layer in the present invention, other tacky layers, or the like, can be used for the lamination.

Incidentally, specific examples of the polarizing plate include: drawn hydrophilic macromolecular films, such as polyvinyl alcohol type films, partially formalized polyvinyl alcohol type films, and ethylene-vinyl acetate copolymer type partially saponified films, containing iodine and/or dichromatic dye adsorbed thereon; and polyene oriented films, such as dehydrates of polyvinyl alcohol, and dehydrochlorinates of polyvinyl chloride; and so on. The thickness of the polarizing plate made from such a film is generally in a range of 5 μm to 80 μm but is not limited thereto.

Incidentally, the reflection type polarizing plate is used for formation of a liquid-crystal display of the type for reflecting incident light from the visible perception side (display side) to perform display, or the like. The reflection type polarizing plate has an advantage that a built-in light source for back-lighting, or the like, can be omitted so that reduction in thickness of the liquid-crystal display is attained easily, and so on.

The formation of the reflection type polarizing plate can be performed by any suitable method such as a method of additionally providing a reflection layer of a metal, or the like, onto a single surface of a polarizing plate through a transparent resin layer, or the like, as occasion demands. The aforementioned polarizing plate, especially the transparent resin layer provided on either one of or each of the opposite surfaces of the polarizing film as occasion demands, can be configured so that the protective film 1 serves also as the transparent resin layer as shown in the drawings.

A specific example of the reflection type polarizing plate is a polarizing plate having a reflection layer formed by additional provision of foil or vapor deposition film of a reflective metal such as aluminum, or the like, onto a single surface of a transparent resin layer of a protective film, or the like, matted as occasion demands. Another example is a polarizing plate having a fine-rough-structure reflection layer on a surface fine rough structure formed from the aforementioned transparent resin layer containing fine particles. Incidentally, the mode of use in a state in which the reflection surface is coated with a transparent resin layer, a polarizing plate, or the like, is preferable in terms of preventing the reflection factor from lowering due to oxidation, holding the initial reflection factor for a long term, avoiding additionally separately providing a protective layer, and so on.

The aforementioned fine-rough-structure reflection layer has an advantage that incident light is diffused by diffused reflection so that both directivity and glaring appearance can be prevented, and unevenness in light and shade can be suppressed. Further, the transparent resin layer containing fine particles has an advantage that incident light and reflected light due to the reflection of the incident light is diffused when the light passes through the transparent resin layer so that unevenness in light and shade can be suppressed. The formation of the fine-rough-structure reflection layer influenced by the surface fine rough structure of the transparent resin layer can be performed by directly applying a metal onto a surface of the transparent resin layer by any suitable one of vapor deposition and plating methods such as a vacuum vapor deposition method, an ion plating method, a sputtering method, and so on.

Incidentally, a polymer, or the like, excellent in transparency, mechanical strength, heat stability, water shielding characteristic, etc. is preferably used for the formation of the protective film or the transparent protective layer. Examples of the polymer include polyester type resins, acetate type resins, polyether sulfone type resins, polycarbonate type resins, polyamide type resins, polyimide type resins, polyolefin type resins, acrylic type resins, acrylic type heat-curable or ultraviolet-curable resins, urethane type heat-curable or ultraviolet-curable resins, acrylic urethane type heat-curable or ultraviolet-curable resins, epoxy type heat-curable or ultraviolet-curable resins, silicone type heat-curable or ultraviolet-curable resins, and so on.

The transparent protective layer may be formed by any suitable method such as a method of applying a polymer, a method of laminating polymers provided as films, or the like. The thickness of the transparent protective layer may be determined suitably. The thickness of the transparent protective layer is generally selected to be not larger than 500 μm, preferably in a range of from 1 μm to 300 μm, especially in a range of from 5 μm to 200 μm. Incidentally, transparent fine particles such as inorganic fine particles of silica, alumina, titania, zirconia, tin oxide, indium oxide, cadmium oxide, antimony oxide, etc., for example, with a mean particle size of from 0.5 μm to 20 μm, and organic fine particles of crosslinked or non-crosslinked polymers, etc., are used as the fine particles contained for the formation of the transparent resin layer having the surface fine rough structure. The inorganic fine particles may be electrically conductive. The amount of use of the fine particles is generally from 2 parts by weight to 25 parts by weight, especially from 5 parts by weight to 20 parts by weight per 100 parts by weight of the transparent resin.

On the other hand, specific examples of the phase-difference plate as one of the aforementioned optical materials include: a birefringent film formed by drawing a film of any suitable polymer such as polycarbonate, polyvinyl alcohol, polystyrene, polymethyl methacrylate, polypropylene, other polyolefins, polyallylate, polyamide; an oriented film of a liquid-crystal polymer; and so on. The phase-difference plate may be formed by lamination of two kinds or more of phase-difference layers so that optical characteristic such as phase difference, or the like, is controlled.

Further, the elliptically polarizing plate or the reflection type elliptically polarizing plate as one of the aforementioned optical materials is formed by lamination of a suitable combination of polarizing plates or reflection type polarizing plates and phase-difference plates. Although the elliptically polarizing plate, or the like, can be formed by laminating (reflection type) polarizing plates and phase-difference plates successively separately in a process of production of a liquid-crystal display to obtain a combination thereof, the elliptically polarizing plate, or the like, formed in advance in the aforementioned manner is excellent in quality stability, laminating efficiency, etc. so as to have an advantage that efficiency in production of the liquid-crystal display can be improved.

The tacky layer provided on either one of or each of two surfaces of the optical material has an initial adhesive force of not smaller than 400 g per 25 mm on the basis of 90° peeling (in the condition of room temperature and a peeling rate of 300 mm/min, which shall apply hereinafter) from the resin substrate and has an adhesive force of not larger than 1000 g per 25 mm after heating at 70° C. for 5 hours.

For the aforementioned reason, the optical member can be peeled or released easily without causing any injury of a liquid-crystal cell and without causing any injury of a resin substrate as a cell substrate of the liquid-crystal cell at the time of mistaken adhesive bonding, or the like, so that the liquid crystal cell can be recycled. Further, the optical member can exhibit stable adhesive characteristic in an adhesively bonded state so that defects such as peeling, rising, foaming, etc. hardly occur, even in the case where the liquid-crystal cell is of a thin type or of a large-sized type.

If the initial adhesive force is smaller than 400 g per 25 mm, stable adhesive characteristic in an adhesively bonded state becomes poor so that defects such as peeling, rising, foaming, etc. occur easily in practical use. If the adhesive force after heating is larger than 1000 g per 25 mm, the liquid-crystal cell or the cell substrate thereof is injured easily when the optical member is peeled or released.

The tacky layer which is preferable in terms of balance among prevention of cell damage, or the like, at the time of separating or releasing, smooth workability, stable adhesive characteristic in an adhesively bonded state, etc., has an initial adhesive force of not larger than 900 g per 25 mm, preferably in a range of from 450 to 800 g per 25 mm, especially in a range of from 500 to 750 g per 25 mm and has an adhesive force of not larger than 950 g per 25 mm, preferably not larger than 900 g per 25 mm, especially not larger than 850 g per 25 mm after heating at 70° C. for 5 hours.

A tacky substance or an adhesive containing a suitable polymer such as an acrylic type polymer, a silicone type polymer, polyester, polyurethane, polyether, synthetic rubber, or the like, as a base polymer can be used for the formation of the tacky layer. It is not limited specifically. Above all, a material, such as an acrylic type adhesive, excellent in optical transparency, exhibiting moderate tackiness in wetness, cohesiveness and adhesiveness and excellent in weather resistance, heat resistance, etc., can be used preferably.

A tacky layer low in coefficient of moisture absorption and excellent in heat resistance in addition to the above description is preferable in terms of prevention of foaming and peeling phenomena caused by moisture absorption, prevention of lowering of optical characteristic and warping of a liquid-crystal cell caused by thermal expansion, etc., formation of a liquid-crystal display excellent in quality and durability, and so on.

The tacky layer may contain any suitable additives such as fillers, pigments, colorants, anti-oxidants, etc., for example, selected from natural or synthetic resins, especially tackifying resins, glass fibers, glass beads, metal powder materials and other inorganic powder materials, etc. if the additives can be added to the tacky layer. The tacky layer may also contain fine particles so as to exhibit-light diffusibility.

The additional provision of the tacky layer on either one or each of the two surfaces of the optical material can be performed by a suitable method. Examples of the method include: a method in which a tacky substance or composition thereof is dissolved or dispersed in a suitable single solvent such as toluene, ethyl acetate, or the like, or in a mixture solvent thereof so that from about 10% by weight to about 40% by weight of an adhesive solution is prepared and then the adhesive solution is directly applied onto the optical material by a suitable spreading means such as a flow-casting means, a coating means, or the like; a method in which a tacky layer is formed on a separator according to the aforementioned method and then transferred onto the optical material; and so on.

The tacky layer may be provided as a superimposed layer made from different compositions or kinds so that the superimposed layer can be provided on either one or each of the two surfaces of the optical material. Further, when tacky layers are to be provided on both surfaces of the optical material, the tacky layers different in compositions or kinds may be provided on the front and rear surfaces of the optical material, respectively. The thickness of the tacky layer can be determined suitably in accordance with the purpose of use, or the like, and is generally in a range of from 1 to 500 μm. When the tacky layer is exposed to a surface, it is preferable that the surface is coated with a separator 4, or the like, so as to be protected as shown in the drawings until the optical material is put into practical use.

Incidentally, each of the layers for forming the optical member such as a polarizing plate, a phase-difference plate, a protective film, a transparent protective layer, a tacky layer, or the like, can be made to have ultraviolet absorption power by a suitable method such as a method of treating the layer with an ultraviolet absorbent such as a salicylic acid ester type compound, a benzophenol type compound, a benzotriazole type compound, a cyanoacrylate type compound, a nickel complex salt type compound, or the like.

The optical member according to the present invention can be adhesively bonded to a suitable device such as a liquid-crystal cell, or the like. Especially, the optical member can be used advantageously when the optical member is adhesively bonded to a liquid-crystal cell using, as a cell substrate, a resin substrate having an initial adhesive force of not smaller than 400 g per 25 mm on the basis of 90° peeling from a tacky layer provided on an optical material and having an adhesive force of not larger than 1000 g per 25 mm after heating at 70° C. for 5 hours.

The aforementioned resin substrate can be formed from a suitable resin such as a thermoplastic resin, a heat-curable resin, or the like. The resin substrate which can be used preferably in terms of heat resistance, or the like, at the time of provision of a transparent electrically conductive film, is made from a resin having a glass-transition temperature of not lower than 130° C., preferably not lower than 150° C., especially not lower than 160° C.

Further, the resin substrate is preferably excellent in transparency and impact resistance, especially the resin substrate preferably has a light permeability of not lower than 80%. Further, the resin substrate is preferably excellent in chemical resistance, optical isotropy, low water absorption characteristic, low moisture permeability and gas barrier characteristic With respect to oxygen, or the like, in terms of prevention of denaturation of a liquid crystal, durability in application to a liquid-crystal cell, and so on. In addition, a resin substrate having a tensile modulus of elasticity in a range of from $3 \times 10^4$ kgf/cm$^2$ to $5 \times 10^4$ kgf/cm$^2$ is preferable in terms of the peel strength of the optical member against peeling, or the like.

Incidentally, examples of the resin for forming the resin substrate include: thermoplastic resins such as polycarbonate, polyarylate, polyether-sulfone, polyester, polysulfone, polymethyl methacrylate, polyether-imide, polyamide, etc.; heat-curable resins such as an epoxy type resin, unsaturated polyester, polydiallyl phthalate, polyisobornyl methacrylate, etc.; and so on. Any one of such resins may be used singly or any two or more kinds selected from such resins may be used in combination. Any one of such resins may be used as a copolymer with another component, a mixture with another component, or the like.

From the aforementioned performance, the resin substrate which can be used particularly preferably is made from a cured material of an epoxy type composition containing an epoxy type resin, especially an alicyclic epoxy resin, an acid anhydride type curing agent, and a phosphorus type curing catalyst. As the alicyclic epoxy resin, any suitable one selected from various alicyclic epoxy resins can be used without any specific limitation.

Examples of the acid anhydride type curing agent include phthalic anhydride, 3,6-endo-methylene-tetrahydrophthalic anhydride, succinic anhydride, maleic anhydride, hexahydrophthalic anhydride, tetrahydrophthalic anhydride, methyl-hexahydrophthalic anhydride, methyl-tetrahydrophthalic anhydride, and so on. Especially, colorless or light yellow acid anhydrides such as hexahydrophthalic anhydride, tetrahydrophthalic anhydride, methyl-hexahydrophthalic anhydride, methyl-tetrahydrophthalic anhydride, etc. can be used preferably. The amount of the acid anhydride type curing agent to be added is preferably in a range of from 0.5 to 1.3 equivalents per one epoxy equivalent in the epoxy resin.

Examples of the phosphorous type curing catalyst include alkyl phosphines, phosphine oxides, phosphonium salts, and so on. The amount of the phosphorous type curing catalyst to be added is preferably in a range of from 0.2 parts by weight to 10 parts by weight, especially in a range of from 0.5 parts by weight to 4 parts by weight per 100 parts by weight of the acid anhydride type curing agent.

The formation of the resin substrate can be performed by any suitable method such as a casting molding method, a flow-casting molding method, an injection molding method, a roll coating molding method, an extrusion molding method, a transfer molding method, a reaction injection molding method (RIM), or the like. At the time of the formation of the resin substrate, any suitable additives such as a dye, a denaturant, an anti-discoloring agent, an antioxidant, an ultraviolet absorbing agent, a releasant, a reactive diluent, a non-reactive diluent, etc. can be added as occasion demands so long as transparency is not spoiled.

The thickness of the resin substrate is preferably not larger than 1 mm, especially not larger than 0.8 mm, further especially in a range of from 0.1 to 0.5 mm in terms of reduction in thickness and weight, strength, prevention of denaturation, and so on. Incidentally, the resin substrate may be formed as a single-layer substance or as a laminate. Accordingly, the thickness of the resin substrate may be achieved as that of a laminate of two or more layers made from one kind of resin or from different kinds of resins.

As occasion demands, a gas barrier layer may be provided on the resin substrate for the purpose of shielding water and oxygen which is a cause of curving the substrate, denaturing the liquid crystal, etc. The gas barrier layer is generally formed from a macromolecular coating film for the purposes of durability, good deformability, and so on. A polymer having a small oxygen permeability coefficient, such as polyvinyl alcohol, partially saponified polyvinyl alcohol, ethylene-vinyl alcohol copolymer, polyacrylonitrile, polyvinylidene chloride, or the like, may be used preferably as the macromolecule. Especially, a vinyl alcohol type polymer is preferable in terms of gas barrier characteristic, water diffusion characteristic, evenness of water absorption, and so on.

The formation of the gas barrier layer can be performed by a macromolecular solution spreading method, or the like, using a suitable coating method such as a casting method, a spin coating method, or the like. The thickness of the gas barrier layer is preferably not larger than 15 $\mu$m, especially in a range of from 1 to 10 $\mu$m in terms of transparency, prevention of discoloration, gas barrier characteristic with respect to oxygen, water vapor, or the like, and so on.

As occasion demands, a coat layer may be provided on a surface of adhesion of the resin substrate to the tacky layer for the purpose of improvement of scuff resistance, or the like, on the basis of control of adhesive power to the tacky layer and hardening of the surface. When the resin substrate has the aforementioned gas barrier layer, the coat layer is provided on the gas barrier layer. The coat layer can be formed from a crosslinkable resin suitable for forming a transparent hard film. Especially, an ultraviolet-curable resin such as an urethane acrylate type resin, an epoxy type resin, or the like, using a multifunctional monomer capable of being three-dimensionally crosslinked by ultraviolet radiation through a photocatalyst, or the like, can be used preferably.

The formation of the coat layer may be performed by a method, or the like, in which a resin solution is spread on a resin substrate, a gas barrier layer, or the like, by any suitable coating system such as a casting system, a spin coating system, a dipping system, or the like, and then crosslinked. The thickness of the coat layer can be determined suitably and is generally not larger than 200 $\mu$m, especially not larger than 100 $\mu$m, further especially in a range of from 1 $\mu$m to 50 $\mu$m.

As occasion demands, an inorganic oxide layer may be provided on the resin substrate on the transparent electrically conductive film-provision side opposite to the coat layer-provision side for the purpose of improvement of adhesion of the transparent electrically conductive film, or the like. The inorganic oxide layer can be formed from a known inorganic oxide for forming a transparent layer. Especially, the inorganic oxide layer is preferably formed from a hydrolytic condensation polymer of metal alcoxide in terms of the aforementioned adhesion, or the like.

As the metal alcoxide, there can be used any one such as alkoxysilane, alkoxyaluminum, alkoxytitanium, alkoxyantimony, alkoxyzircon, or the like, suitable for forming a transparent inorganic oxide by hydrolytic condensation polymerization. Especially, the metal alcoxide which can be used preferably in terms of easiness of reaction, or the like, is alkoxysilane.

Incidentally, specific examples of the alkoxysilane include: tetraalkoxysilane such as tetramethoxysilane, tetraethoxysilahe, tetra-n-propoxysilane, tetraisopropoxysilane, tetra-n-butoxysilane, tetra-sec-butoxysilane, and tetra-tert-butoxysilane; monoalkyltrialkoxysilane such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, γ-chloropropyltrimethoxysilane, γ-chloropropyltriethoxysilane, methyltriisopropoxysilane, thyltriisopropoxysilane, isopropyltriisopropoxysilane, n-propyltriisopropoxysilane, methyltri-n-propoxysilane, ethyltri-n-propoxysilane, isopropyltri-n-propoxysilane, n-propyltri-n-propoxysilane, γ-chloropropyltriisopropoxysilane, γ-chloropropyltri-n-propoxysilane, methyldimethoxyisopropoxysilane, methylmethoxydiisopropoxysilane, ethyldiethoxyisopropoxysilane, ethylethoxydiisopropoxysilane, methyldiethoxyisopropoxysilane, and methylethoxydiisopropoxysilane; and so on.

The formation of the inorganic oxide layer may be performed by a method, or the like, in which a solution of metal alcoxide and water dissolved in a suitable hydrophilic solvent such as alcohol, or the like, is spread on a predetermined surface of the resin substrate by any suitable coating system such as a casting system, a spin coating system, a dipping system, or the like, and heated as occasion demands so that metal alcoxide is hydrolytically condensation polymerized while both water and solvent are vaporized to thereby form an inorganic oxide. The thickness of the inorganic oxide layer thus formed can be determined suitably in accordance with the purpose of use, or the like, and is generally not larger than 50 μm, especially not larger than 20 μm, further especially in a range of from 0.1 μm to 5 μm.

Two or more kinds of metal alcoxide may be used for preparing the aforementioned spread solution. It is further preferable that the pH value of the spread solution is adjusted to be in a range of from 2 to 5 in terms of acceleration of the hydrolytic condensation polymerization reaction. Any suitable acid such as nitric acid, hydrochloric acid, acetic acid, or the like, can be used for the adjustment. Incidentally, the hydrolytic condensation polymerization reaction of metal alcoxide can progress at the room temperature. It is, however, preferable that metal alcoxide is heated at a temperature of from 80° C. to 200° C. for a time of from 30 minutes to 120 minutes in terms of quickening the reaction.

Further, inorganic oxide particles may be dispersed and contained in the inorganic oxide layer for the purpose of greater improvement of adhesive power of the transparent electrically conductive film, or the like, caused by an anchor effect, or the like, based on a rough structure. Examples of the inorganic oxide particles used include suitable particles exhibiting transparency in-the inorganic oxide layer, such as silica particles, alumina particles, titanium oxide particles, antimony oxide particles, zirconia particles, or the like. Especially, alumina particles are preferable.

Figure 3:
FIG. 3 is a sectional view of an example of a cell substrate.
Figure 4:
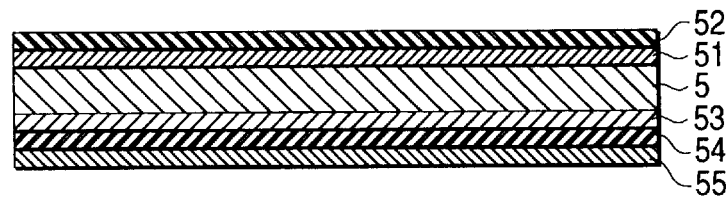
FIG. 4 is a sectional view of another example of the cell substrate.

FIGS. 3 and 4 show examples of the cell substrate made from the resin substrate according to the present invention. The reference numeral 5 designates a resin substrate; 51, a gas barrier layer provided as occasion demands; 52, a coat layer provided as occasion demands; and 53, an inorganic oxide layer provided as occasion demands. Further, in FIG. 4, the reference numeral 54 designates an $SiO_x$ layer; and 55, a transparent electrically conductive film.

The cell substrate according to the present invention can be used preferably for forming a liquid-crystal display, especially a liquid-crystal cell. Particularly for the formation of a liquid-crystal cell, there is preferably used the cell substrate which exhibits transparency so that permeability measured by a spectrophotometer with respect to light having a wavelength of 600 nm is not lower than 60%, especially not lower than 80% when the cell substrate is 0.4 mm thick.

For the formation of the liquid-crystal cell, the cell substrate can be put into practical use as a superimposed substrate with various functional layers such as a phase-difference plate, a polarizing plate, a transparent electrically conductive film, etc. FIG. 4 shows an example of the superimposed substrate with a transparent electrically conductive film 55. In this example, the transparent electrically conductive film 55 is provided through the $SiO_x$ layer 54 for the purpose of improvement of adhesive power, or the like.

Any suitable one selected from indium oxide, tin oxide, indium-tin mixture oxide, gold, platinum, palladium, transparent electrically conductive paint, etc. can be used and any one of known substances can be used for forming the transparent electrically conductive film. Further, the formation of the transparent electrically conductive film can be performed by a method according to the background art, such as a method of additionally providing the transparent electrically conductive film by means of vacuum vapor deposition, sputtering, or the like, a method of applying transparent electrically conductive paint, or the like. Accordingly, the transparent electrically conductive film can be formed directly in the form of a predetermined pattern.

The transparent electrically conductive film which is preferable in terms of prevention of curving of the cell substrate, or the like, in the present invention is a film containing indium-tin mixture oxide as a main component and provided through the $SiO_x$ layer. Incidentally, the formation of the $SiO_x$ layer can be performed by a method according to the aforementioned transparent electrically conductive film forming method.

Figure 5:
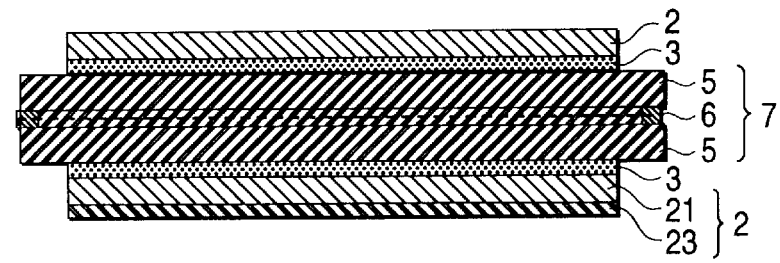
FIG. 5 is a sectional view of an example of a liquid-crystal display.

The formation of the liquid-crystal cell can be performed by a method, or the like, in which cell substrates each having the aforementioned transparent electrically conductive film patterned as an electrode are disposed opposite to each other so that liquid crystal is enclosed between the cell substrates. FIG. 5 shows an example thereof. The reference numeral 7 designates a liquid-crystal cell; and 6, a liquid-crystal layer thereof. An oriented film for liquid-crystal arrangement provided on the transparent electrically conductive film as occasion demands can be also formed by a method according to the background art. The liquid-crystal cell thus formed is of any suitable type such as a TN type, an STN type, a TFT type, a ferroelectric liquid crystal type, or the like. Incidentally, with respect to the cell substrate, the optical member according to the present invention may be adhesively bonded to a resin substrate through the tacky layer in advance so that the optical member may be used for forming a liquid-crystal cell.

The liquid-crystal display according to the present invention can be formed as a structure in which the optical member according to the present invention is adhesively bonded, through the tacky layer, to either one of or each of the two surfaces of a liquid-crystal cell formed by use of the cell substrate according to the present invention. FIG. 5 shows an example thereof. Incidentally, the liquid-crystal display shown in FIG. 5 is a reflection type display in which a polarizing plate 21 having a reflection layer 23 is provided on the visible back side of the liquid-crystal cell 7.

The optical member may be adhesively bonded to the cell substrate before the formation of the liquid-crystal display or the optical member may be adhesively bonded to the liquid-crystal cell after the formation of the liquid-crystal cell. The adhesive bonding is performed so that the polarizing plate, the phase-difference plate, etc. are located in predetermined arrangement positions. The arrangement positions can be set according to the background art.

When the optical material is made from a polymer film, the optical member according to the present invention has flexibility so as to be applied easily to a curved surface, a large-area surface, etc. For example, the optical member can be applied to any suitable types of liquid-crystal cells such as an active matrix drive type liquid-crystal cell represented by a thin-film transistor type liquid-crystal cell, a simple matrix drive type liquid-crystal cell represented by a TN type liquid-crystal cell or an STN type liquid-crystal cell, etc. so that various liquid-crystal displays can be formed.

EMBODIMENT 1

In a four-necked flask, 100 parts (parts by weight, which shall apply hereinafter) of isooctyl acrylate, 2 parts of 6-hydroxyhexyl acrylate and 0.5 parts of 2,2'-azobisisobutyronitrile were added to 200 parts of ethyl acetate to produce a reaction at about 60° C. under stirring to thereby obtain a polymer solution. In the polymer solution, 0.5 parts of an isocyanate type crosslinker per 100 parts of the solid content of the polymer solution were mixed to thereby obtain an acrylic type adhesive. The acrylic type adhesive was applied onto a separator of a polyester film surface-coated with a silicone type releasant and was heated at 150° C. for 5 minutes to thereby provide a tacky layer 25 μm thick. Then, the separator was adhesively bonded to a single surface of a polarizing film to thereby obtain an optical member.

On the other hand, a mixture consisting of 100 parts of an alicyclic epoxy resin represented by the following formula, 125 parts of methylhexahydrophthalic anhydride and 1 part of tri-n-butyloctylphosphonium bromide was injected in a mold and cured at 120° C. for 2 hours to thereby obtain a resin substrate 0.4 mm thick.

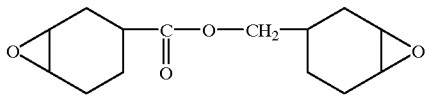

Then, an urethane acrylate type resin represented by the following formula was applied onto a single surface of the aforementioned resin substrate by a spin-coating method and crosslinked by ultraviolet radiation to thereby form a coat layer 5 μm thick. Thus, a cell substrate was obtained.

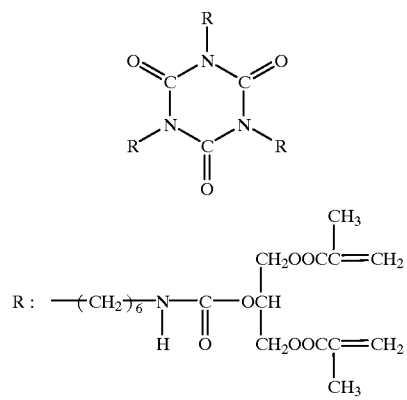

Comparative Example 1

An acrylic type adhesive was prepared in the same manner as in Embodiment 1 except that 5 parts of an isocyanate type crosslinker were added to a mixture of 100 parts of butyl acrylate and 5 parts of acrylic acid substituted for isooctyl acrylate and 6-hydroxyhexyl acrylate. Thus, an optical member was obtained in the same manner as in Embodiment 1.

Comparative Example 2

An optical member was obtained in the same manner as in Comparative Example 1 except that the thickness of the tacky layer was set to be 5 μm.

EVALUATION TEST

Initial Adhesive Force and Thermal Adhesive Force

Each of the 25 mm wide optical members obtained in Embodiment and Comparative Examples was pressure-bonded to a coating surface of the resin substrate obtained in Embodiment 1, through the tacky layer thereof by moving a 2 kg rubber roller forward and backward. After the resin substrate was left in an autoclave at 50° C. under a pressure of 5 atmospheres for 15 minutes so that the adhesively bonded state of the optical member was matured, the resin substrate was cooled to the room temperature. In this occasion, the adhesive force of the optical member based on 90° peeling (in the condition of a peeling rate of 300 mm/min and 25° C., which shall apply hereinafter) was examined as an initial adhesive force. After the adhesively bonded state was matured in the autoclave in the aforementioned manner, the resin substrate was heated at 70° C. for 5 hours and then cooled to the room temperature. In this occasion, the adhesive force of the optical member based on 90° peeling was examined as a thermal adhesive force.

Releasability

Each of the 12 inches-size optical members obtained in Embodiment and Comparative Examples was adhesively bonded to a coating surface of the resin substrate obtained in Embodiment 1, through the tacky layer thereof by a laminater roll. After the resin substrate was left in an autoclave at 60° C. under a pressure of 5 atmospheres for 15 minutes, the resin substrate was cooled to the room temperature. In this occasion, the optical member was peeled or released manually by a worker to thereby examine whether there was any rupture of the resin substrate or not.

Durability

After the resin substrate was left in an autoclave for 15 minutes and then cooled to the room temperature in the same manner as in the releasability test, the resin substrate was put in a thermostatic humidistat under the condition of 60° C. and 90% R.H. for 500 hours and then taken out. In this occasion, the optical member was examined as to whether there was any defect such as peeling, rising, foaming in an adhesive interface, etc. or not. The optical member was evaluated on the basis of the following criterion.

Good: There was no defect acting on visibility.
Poor: There was any defect acting on visibility.

Results of the above description were shown in the following Table. In the Table, the notations 0/5 and 3/5 in the column "Rupture Rate of Resin Substrate" mean frequencies of occurrence of rupture in five test pieces.

| | Release Adhesive Force (g per 25 mm) | | Rupture Rate of Resin Substrate | Durability |
|---|---|---|---|---|
| | Initial | After Heating | | |
| Embodiment 1 | 630 | 842 | 0/5 | Good |
| Comparative Example 1 | 1040 | 1175 | 3/5 | Good |
| Comparative Example 2 | 166 | 188 | 0/5 | Poor |

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical member comprising:

an optical material; and a tacky layer provided on at least one surface of said optical material, said tacky layer having an initial adhesive force of not smaller than 400 g per 25 mm based on 90° peeling from a resin substrate and having an adhesive force of not larger than 1000 g per 25 mm after heating at 70° C. for 5 hours.

2. An optical member according to claim 1, wherein said optical material is selected from the group consisting of a reflection type polarizing plate, a polarizing plate, a phase-difference plate, and an elliptically polarizing plate.

3. A cell substrate comprising a resin substrate having an initial adhesive force of not smaller than 400 g per 25 mm based on 90° peeling from a tacky layer provided on an optical material and having an adhesive force of not larger than 1000 g per 25 mm after heating at 70° C. for 5 hours.

4. A cell substrate according to claim 3, wherein said resin substrate has a surface to be adhesively bonded to said tacky layer, said surface being coat-processed with an urethane acrylate type cured resin.

5. A cell substrate according to claim 3, wherein said resin substrate comprises an epoxy type resin.

6. A cell substrate according to claim 4, wherein said resin substrate comprises an epoxy type resin.

7. A cell substrate according to claim 3, wherein said cell substrate has a tensile modulus of elasticity in a range of from $3 \times 10^4$ kgf/cm$^2$ to $5 \times 10^4$ kgf/cm$^2$.

8. A cell substrate according to claim 4, wherein said cell substrate has a tensile modulus of elasticity in a range of from $3 \times 10^4$ kgf/cm$^2$ to $5 \times 10^4$ kgf/cm$^2$.

9. A cell substrate according to claim 5, wherein said cell substrate has a tensile modulus of elasticity in a range of from $3 \times 10^4$ kgf/cm$^2$ to $5 \times 10^4$ kgf/cm$^2$.

10. A cell substrate according to claim 3, wherein said cell substrate is adhesively bonded to an optical member which comprises said optical material, and said tacky layer provided on at least one surface of said optical material, said tacky layer having an initial adhesive force of not smaller than 400 g per 25 mm based on 90° peeling from a resin substrate and having an adhesive force of not larger than 1000 g per 25 mm after heating at 70° C. for 5 hours.

11. A liquid-crystal display comprising:

(1) An optical member comprising:

an optical material; and a tacky layer provided on at least one surface of said optical material, said tacky layer having an initial adhesive force of not smaller than 400 g per 25 mm based on 90° peeling from a resin substrate and having an adhesive force of not larger than 1000 g per 25 mm after heating at 70° C. for 5 hours; and (2) a liquid-crystal cell including a cell substrate comprising: a resin substrate having an initial adhesive force of not smaller than 400 g per 25 mm based on 90° peeling from said tacky layer provided on said optical material and having an adhesive force of not larger than 1000 g per 25 mm after heating at 70° C. for 5 hours, wherein said optical member is adhesively bonded to at least one surface of said liquid-crystal cell through said tacky layer of said optical member.

12. A liquid-crystal display according to claim 11, wherein said optical material is selected from the group consisting of a reflection type polarizing plate, a polarizing plate, a phase-difference plate, and an elliptically polarizing plate.

13. A liquid-crystal display according to claim 11, wherein said resin substrate has a surface to be adhesively bonded to said tacky layer, said surface being coat-processed with an urethane acrylate type cured resin.

14. A cell substrate according to claim 11, wherein said resin substrate comprises an epoxy type resin.

15. A cell substrate according to claim 12, wherein said resin substrate comprises an epoxy type resin.

16. A cell substrate according to claim 13, wherein said cell substrate has a tensile modulus of elasticity in a range of from $3 \times 10^4$ kgf/cm$^2$ to $5 \times 10^4$ kgf/cm$^2$.

17. A cell substrate according to claim 12, wherein said cell substrate has a tensile modulus of elasticity in a range of from $3 \times 10^4$ kgf/cm$^2$ to $5 \times 10^4$ kgf/cm$^2$.

18. A cell substrate according to claim 14, wherein said cell substrate has a tensile modulus of elasticity in a range of from $3 \times 10^4$ kgf/cm$^2$ to $5 \times 10^4$ kgf/cm$^2$.

* * * * *